(No Model.)
P. HIEN.
LOCKING DEVICE FOR UNLOCKING LEVERS OF CAR COUPLINGS.
No. 576,673. Patented Feb. 9, 1897.
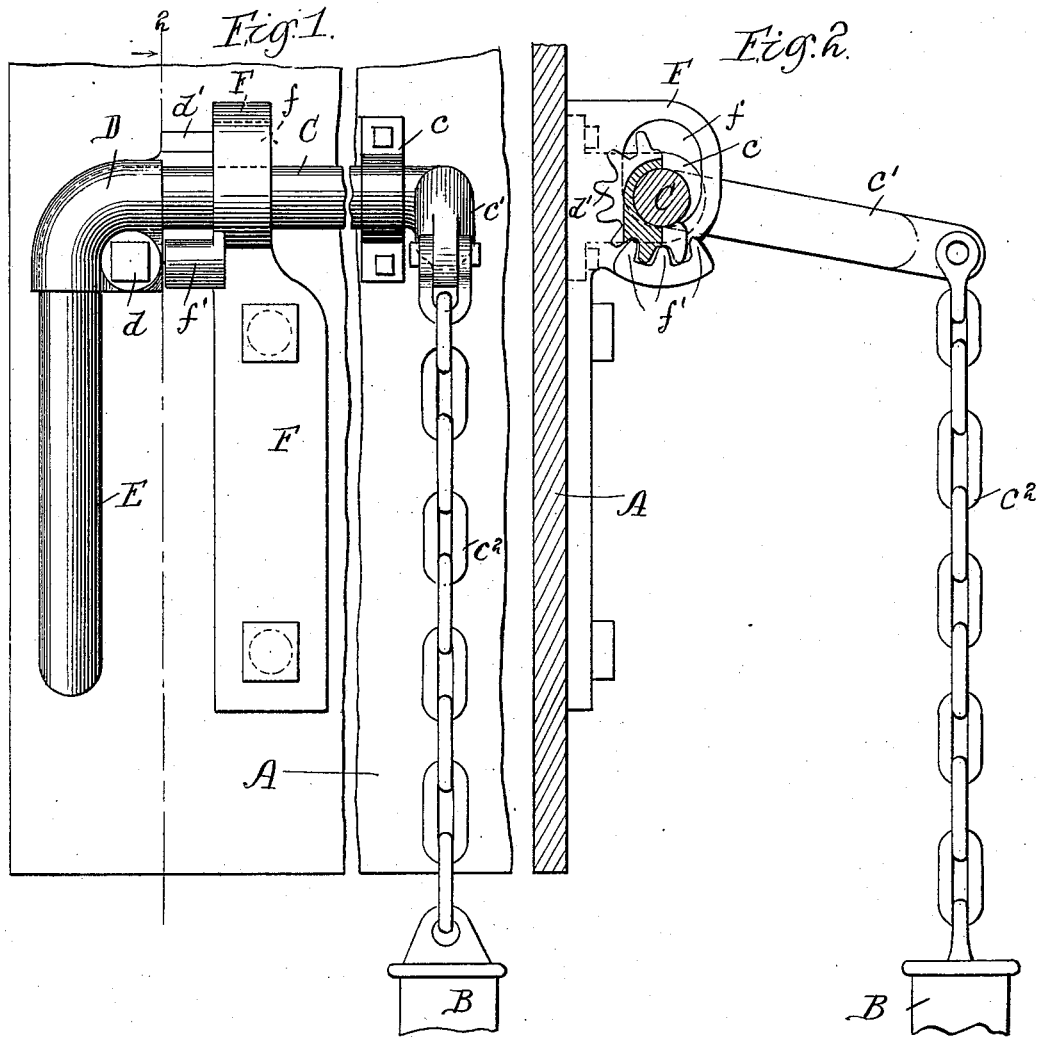
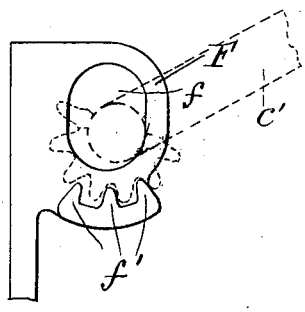
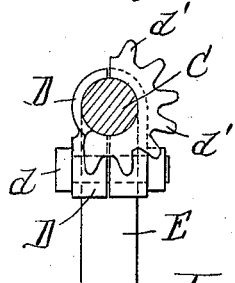
Witnesses.
Inventor.
Phillip Hien
by Walter H. Chamberlin
Atty.
THE NORRIS PETERS CO., PHOTO-LITHO., WASHINGTON, D. C.

UNITED STATES PATENT OFFICE.

PHILLIP HIEN, OF CHICAGO, ILLINOIS.

LOCKING DEVICE FOR UNLOCKING-LEVERS OF CAR-COUPLINGS.

SPECIFICATION forming part of Letters Patent No. 576,673, dated February 9, 1897.

Application filed April 1, 1896. Serial No. 585,770. (No model.)

*To all whom it may concern:*

Be it known that I, PHILLIP HIEN, a citizen of the United States, residing at Chicago, county of Cook, State of Illinois, have invented a certain new and useful Improvement in Locking Devices for the Unlocking-Levers of Car-Couplers; and I declare the following to be a full, clear, and exact description of the invention, such as will enable others skilled in the art to which it pertains to make and use the same, reference being had to the accompanying drawings, which form a part of this specification.

My invention has for its object the production of mechanism for permitting the locking of the pin-lifting lever of a car-coupler at any desired position—that is, the mechanism produced by my invention enables the operator, after he has employed the lifting-lever to move the pin or other knuckle-dogging device, to lock that lever at any desired point, so as to hold the lock in the desired position until intentionally released.

Essentially it consists in the provision of a ratchet or toothed engagement between the movable lever and a stationary point, either one or both being provided with a series of projections adapted to engage with either a single one or a series of projections on the other.

In the drawings, Figure 1 is a front elevation. Fig. 2 is a vertical section on the line 2 2 of Fig. 1. Figs. 3 and 4 are details.

In carrying out the invention, A represents the end of the car, and B the coupling-pin or other locking device for the knuckle.

C is the usual lever employed to unlock the knuckle. It is supported by the bearing-fitting $c$ and bent to form the arm $c'$, to the end of which is engaged the chain $c^2$, connecting the lever with the pin B. At the other end of the lever C is the two-part fitting D, held together by the bolt $d$, said fitting receiving and clamping the end of the lever C and also the end of the handle E, thus making them practically one.

F is a fitting engaged to a stationary point, having the elongated slot $f$, through which the lever C is passed, the fitting thus constituting a bearing for the lever. The construction above described is that employed very generally at the present time as a lifting device for the coupler-locking device.

I will now describe the mechanism constituting my improvement. On the fitting F is a series of three upwardly-extending teeth or projections $f'$. On the fitting D is a series of seven teeth or projections $d'$, constituting a segment of a gear. The teeth $f'$ are shaped and arranged to mesh with the teeth $d'$, so that when in mesh their engagement, together with the bearing of the lever C in the elongated slot $f$, constitutes a lock to prevent the revolution of the lever C and consequently to prevent the tilting of the arm $c'$.

The operation is obvious. Assume that the locking device B is in its lowermost or locking position and it is desired to raise it to unlock the knuckle and to keep it raised. The operator grasps the handle E and lifts the lever C until the teeth disengage. He then tilts the handle E, thus revolving the lever C and tilting the arm $c'$ until, through the chain $c^2$, the locking device has reached the desired elevation. He then allows the lever C to drop until the teeth $f'$ and $d'$ mesh with each other, when the lever C is locked against revolution until intentionally disengaged. Thus even if in the original construction the chain or connection $c^2$ was not the exact necessary length to permit the locking device to be locked in its upper position, or if the other parts were not properly proportioned to attain this result, or if through wear or from other causes the relative relations of the parts are changed the locking device can still be locked at the desired point, owing to the fact that the locking device for the lever (*i. e.*, the toothed or ratchet engagement) will permit the lever C to be locked at any desired point in its revolution by simply dropping the lever so that the teeth $f'$ $d'$ mesh with each other.

It is of course apparent that many of the details of the above construction may be altered without departing from the spirit of the invention. For instance, there might be but a single projection $f'$ on the fitting F and a series of only two or more projections $d'$ on the fitting D, or there might be but a single projection $d'$ and a series of two or more projections $f'$. The projections $f'$ or the projections $d'$, instead of being integral with their respective fittings, might be engaged to other points and the relative locations of the parts might be altered and still come within the scope of my invention, which consists, essentially, in the provision, between the movable lever C and a stationary point, of a toothed engagement whereby the lever C can be locked in more than one elevating position until intentionally released.

What I claim is—

1. The combination with the lifting-lever of a car-coupler and a slotted bearing for the lever of a series of engaging teeth or projections for locking the lever in the desired position said teeth disengaged by the elevation of the lever in its slotted bearings substantially as described.

2. The combination with the lifting-lever of a car-coupler and a slotted bearing for the lever of a series of engaging teeth or projections on the lever adjacent to the slotted bearing and at least one stationary engaging point said teeth disengaged from the stationary engaging point by the elevation of the lever in its slotted bearing substantially as described.

3. The combination with the lifting-lever of a car-coupler and a slotted bearing for the lever of a series of teeth on the lever, and a series of teeth on the bearing the two sets of teeth adapted to mesh with each other substantially as described.

In testimony whereof I sign this specification in the presence of two witnesses.

PHILLIP HIEN.

Witnesses:
  W. H. CHAMBERLIN,
  DE WITT W. CHAMBERLIN.